(12) United States Patent
Bremer et al.

(10) Patent No.: US 11,684,938 B2
(45) Date of Patent: Jun. 27, 2023

(54) SPRAY PATTERN MONITORING

(71) Applicant: Intelligent Agricultural Solutions LLC, Fargo, ND (US)

(72) Inventors: Marshall T. Bremer, Fargo, ND (US); Nicholas Lloyd Butts, West Fargo, ND (US); Daniel R. Wood, Jr., Fargo, ND (US)

(73) Assignee: AGCO Corporation, Duluth, GA (US)

( * ) Notice: Subject to any disclaimer, the term of this patent is extended or adjusted under 35 U.S.C. 154(b) by 260 days.

(21) Appl. No.: 16/930,957

(22) Filed: Jul. 16, 2020

(65) Prior Publication Data

US 2021/0016309 A1  Jan. 21, 2021

Related U.S. Application Data (60) Provisional application No. 62/876,512, filed on Jul. 19, 2019.

(51) Int. Cl.
| | |
|---|---|
| *G05B 23/02* | (2006.01) |
| *B05B 12/08* | (2006.01) |
| *G01S 17/88* | (2006.01) |
| *H04Q 9/00* | (2006.01) |

(52) U.S. Cl.
CPC ............ *B05B 12/082* (2013.01); *G01S 17/88* (2013.01); *H04Q 9/00* (2013.01); *H04Q 2209/40* (2013.01)

(58) Field of Classification Search
CPC ......... B05B 12/082; G01S 17/88; H04Q 9/00; H04Q 2209/40
See application file for complete search history.

(56) References Cited

U.S. PATENT DOCUMENTS

| | | | |
|---|---|---|---|
| 4,709,857 A | 12/1987 | Wilger | |
| 5,326,036 A | 7/1994 | Wilger | |
| 6,053,427 A | 4/2000 | Wilger et al. | |
| 6,126,088 A | 10/2000 | Wilger et al. | |
| 6,352,031 B1 * | 3/2002 | Barbaccia | H01Q 17/00 |
| | | | 102/365 |
| 7,182,271 B2 * | 2/2007 | Cesak | G01P 13/0086 |
| | | | 239/69 |
| 8,154,711 B1 * | 4/2012 | Scheer | B05B 12/082 |
| | | | 356/3.07 |
| 9,677,986 B1 * | 6/2017 | Baldwin | G01S 7/481 |
| (Continued) | | | |

FOREIGN PATENT DOCUMENTS

| | | | |
|---|---|---|---|
| DE | 19727484 A1 * | 2/1999 | ........... B05B 12/004 |
| DE | 19727484 A1 | 2/1999 | |
| (Continued) | | | |

OTHER PUBLICATIONS

Knoll et al., Detection challenges in quantitative polymer analysis by liquid chromatography (Year: 2021).*

(Continued)

*Primary Examiner* — Quang Pham (57) ABSTRACT

A spray pattern monitoring system includes a spray sensor disposed proximate an outlet of a spray nozzle. The spray sensor has one or more optical sensors configured to emit directional light, such as laser pulses, towards the expected position of a liquid spray emitted from the nozzle. The spray sensor can detect the absence or presence of the liquid spray based on returns of the directional light to the optical sensor.

4 Claims, 5 Drawing Sheets

(56) References Cited

U.S. PATENT DOCUMENTS

| | | | |
|---|---|---|---|
| 10,462,985 B2 | 11/2019 | Wilger | |
| 10,712,187 B2* | 7/2020 | Posselius | A01C 23/047 |
| 11,219,912 B2* | 1/2022 | Bharatiya | G01S 13/04 |
| 2002/0112491 A1* | 8/2002 | Malone | G06F 1/20 |
| | | | 62/171 |
| 2006/0102741 A1* | 5/2006 | Cesak | G01P 13/0086 |
| | | | 239/69 |
| 2007/0076202 A1* | 4/2007 | Cantin | A01M 7/0096 |
| | | | 356/338 |
| 2009/0000391 A1* | 1/2009 | Dorrmann | B05B 12/082 |
| | | | 356/436 |
| 2009/0251687 A1* | 10/2009 | Duineveld | A61C 17/221 |
| | | | 73/627 |
| 2010/0200668 A1* | 8/2010 | Hahn | A01C 23/007 |
| | | | 239/1 |
| 2012/0092177 A1* | 4/2012 | Kuystermans | H04B 3/546 |
| | | | 340/635 |
| 2012/0139982 A1* | 6/2012 | Abe | B41J 2/2142 |
| | | | 347/14 |
| 2013/0119150 A1* | 5/2013 | Cesak | B05B 13/0257 |
| | | | 239/74 |
| 2014/0372071 A1* | 12/2014 | Bowers, III | G01H 1/003 |
| | | | 702/147 |
| 2015/0049335 A1* | 2/2015 | Maselli | B65B 3/04 |
| | | | 356/437 |
| 2015/0115058 A1 | 4/2015 | Wilger | |
| 2017/0024870 A1 | 1/2017 | Reichhardt | |
| 2017/0217586 A1* | 8/2017 | Goelet | B64D 1/16 |
| 2017/0325444 A1* | 11/2017 | Crinklaw | A01M 7/0089 |
| 2019/0022687 A1* | 1/2019 | Brooks | A01M 7/0089 |
| 2019/0029170 A1 | 1/2019 | Wilger | |
| 2019/0166775 A1 | 6/2019 | Wilger | |
| 2019/0257678 A1* | 8/2019 | Posselius | A01C 23/047 |
| 2019/0339103 A1 | 11/2019 | Wilger et al. | |
| 2020/0230633 A1* | 7/2020 | Serrat | G06V 20/56 |
| 2020/0236844 A1* | 7/2020 | Brooks | A01C 23/047 |
| 2020/0239063 A1* | 7/2020 | Brooks | B62D 5/006 |
| 2021/0016309 A1* | 1/2021 | Bremer | B05B 12/004 |
| 2021/0124069 A1* | 4/2021 | Born | G10L 25/51 |
| 2021/0190403 A1* | 6/2021 | Bashar | A01N 1/0252 |
| 2021/0308708 A1* | 10/2021 | Stanhope | B05B 12/082 |
| 2022/0124962 A1* | 4/2022 | Long | B05B 1/202 |
| 2022/0125033 A1* | 4/2022 | Long | B05B 12/12 |

FOREIGN PATENT DOCUMENTS

| | | |
|---|---|---|
| DE | 102016206995 A1 | 10/2017 |
| DE | 102016109406 A1 | 11/2017 |
| EP | 19727484 A1 | 2/1999 |
| EP | 1837596 A2 | 9/2007 |
| WO | WO2013042002 A1 | 3/2013 |
| WO | WO2017079366 A1 | 5/2017 |

OTHER PUBLICATIONS

Wilger, "Wilger Electronic Flow Monitoring System" Bochure, pp. 4.
First United Kingdom Search Report for GB Application No. GB1912732.3, dated Feb. 20, 2020, pp. 4.
Extended European Search Report for EP Application No. 20186149.9, dated Nov. 24, 2020, pp. 7.

* cited by examiner

SPRAY PATTERN MONITORING

CROSS-REFERENCE TO RELATED APPLICATION(S)

This application claims the benefit of U.S. Provisional Application No. 62/876,512 filed Jul. 19, 2019 for "SPRAY PATTERN MONITORING" by M. T. Bremer, N. L. Butts and D. R. Wood, Jr.

BACKGROUND

This disclosure relates generally to sprayers. More particularly, this disclosure relates to spray pattern monitoring for spray nozzles.

Sprayers, such as agricultural sprayers, apply material, such as agricultural liquids, to a surface, such as a field, by emitting sprays of the material. Some sprayers, such as agricultural sprayers, emit the fluid in the form of multiple individual sprays of fluid. Nozzles generate the individual sprays and can be spaced along the width of a supply line, such as a boom in agricultural spraying examples. The material can be applied to the surface according to pre-determined spray distributions. For example, in agricultural sprayers the material can be sprayed in the field according to a prescription map, which is a map that specifies application rates throughout the field. The application rates can vary depending on the field conditions.

During operation, the spray emitted from the nozzle can become non-uniform. A non-uniform spray can cause undesired spraying in the field. Thus, the material may be over-applied or under-applied. For example, sediment or another obstruction may block the nozzle orifice. The components of the nozzle can also wear during operation, leading to non-uniform sprays.

SUMMARY

According to one aspect of the disclosure, a method includes generating, by at least one optical sensor, an output of directional light towards an expected position of a liquid spray emitted from a nozzle; and determining a status of the liquid spray based on a return of the directional light to the optical sensor. The status of the liquid spray is one of the liquid spray is absent and the liquid spray is present.

According to another aspect of the disclosure, a spray sensor for monitoring a liquid spray emitted by a spray nozzle, the spray sensor including at least one optical sensor configured to emit and receive directional light and a sensor controller operably connected to the at least one optical sensor. The sensor controller includes control circuitry; and a memory encoded with instructions that, when executed by the control circuitry, cause the at least one optical sensor to emit the directional light and cause the sensor controller to determine, based on the a return of the directional light received by the at least one optical sensor, a liquid spray status of the liquid spray emitted by the spray nozzle.

DETAILED DESCRIPTION

Figure 1:
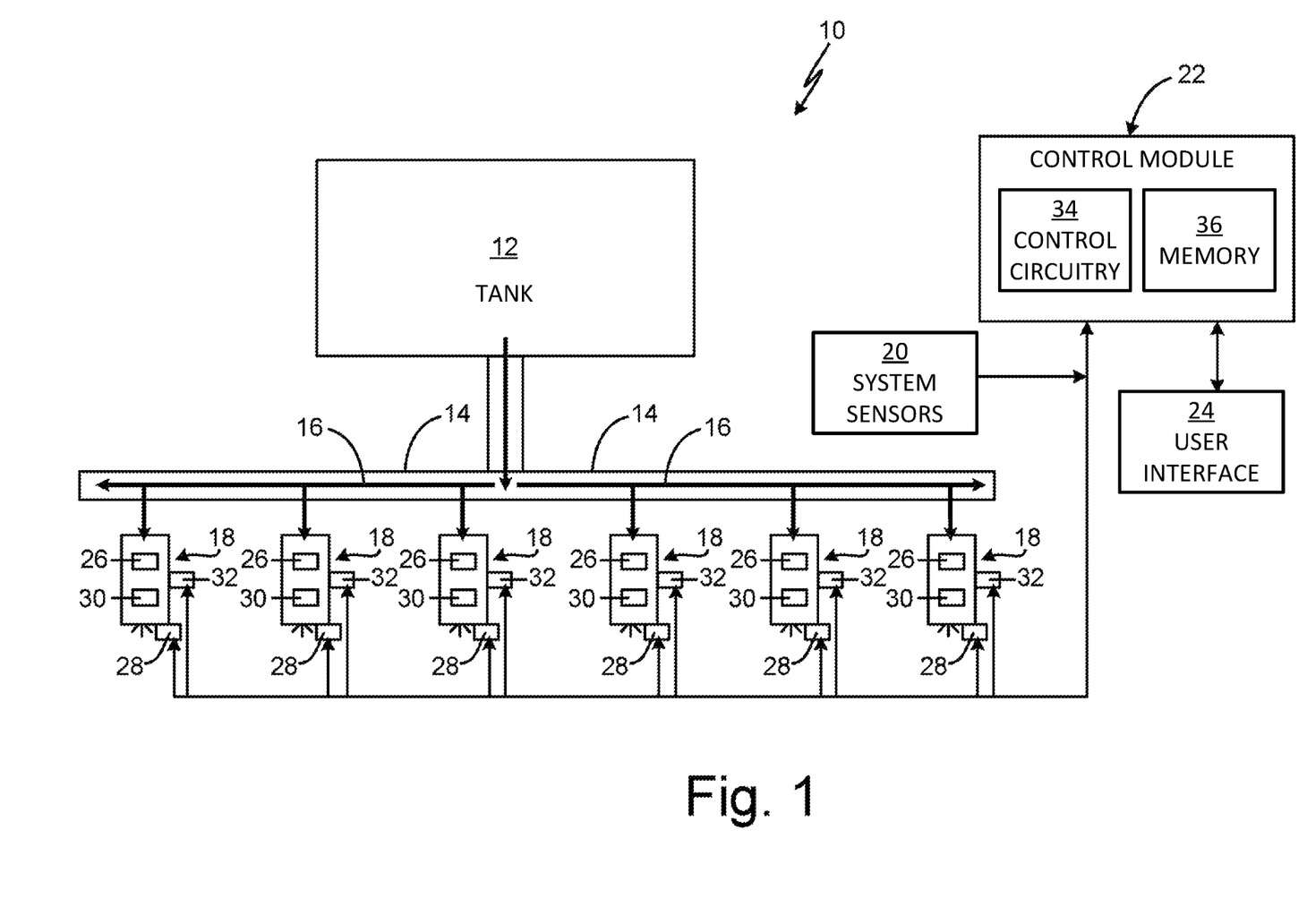
FIG. 1 is a schematic block diagram of a spray system.

FIG. 1 is a schematic block diagram of spray system 10. Spray system 10 includes supply tank 12, booms 14, distribution lines 16, nozzles 18, system sensors 20, control module 22, and user interface 24. Each nozzle 18 includes nozzle sensors 26, spray sensor 28, valve 30, and nozzle controller 32. Control module 22 includes control circuitry 34 and memory 36.

Spray system 10 is configured to apply liquid sprays onto a target surface via nozzles 18. For example, spray system 10 can be part of an agricultural spraying system configured to apply liquid sprays to fields. Spray system 10 can be configured to apply herbicides, pesticides, fungicides, and liquid fertilizers, among other options. In some examples, spray system 10 can be integrated into a self-propelled agricultural sprayer. In other examples, spray system 10 can be attached to and towed by another agricultural implement. While spray system 10 is described as implemented in an agricultural sprayer, it is understood that spray system 10 can be operated according to the techniques described herein in multiple environments and across a variety of applications. For example, spray system 10 can be implemented on an all-terrain vehicle spraying system, on an irrigation system, and on ice resurfacing equipment, among other options. System sensors 20 are configured to generate data regarding spray system 10 during operation. For example, system sensors 20 can be configured to generate any one or more of geo-positioning data, ground speed data, and wheel deflection data, among other types of data.

Spray system 10 can be integrated into a vehicle that is configured to traverse a surface that the spray is applied to. Supply tank 12 is mounted to the vehicle and stores a supply of liquid for spraying. Supply tank 12 can be mounted to a frame and/or supported by any desired surface of the vehicle. For example, supply tank 12 can be mounted to the frame of an agricultural spraying implement and/or supported by the bed of a truck or other vehicle. Supply tank 12 is configured to provide the liquid to distribution lines 16. Spray system 10 can include a motive device of any desired configuration for driving the liquid through distribution lines 16. For example, supply tank 12 can be pressurized and/or a pump can be disposed to pump the liquid from supply tank 12 through distribution lines 16 to nozzles 18.

Distribution lines 16 are fluidly connected to supply tank 12 to receive liquid from supply tank 12. Distribution lines 16 can be of any configuration suitable for conveying the liquid from supply tank 12 to nozzles 18. For example, distribution lines 16 can be tubular supply manifolds that project from an agricultural spraying implement. Distribution lines 16 are supported by booms 14 that project laterally from the implement relative to a direction of travel of the implement. The booms 14 can be employed as a single structure or multiple structures supported by the implement. For example, the boom 14 can have two structural sections extending laterally from opposite sides of the vehicle. In some examples, multiple nozzles 18 can be connected to a common distribution line 16 such that a single distribution line 16 feeds each of the multiple nozzles 18. In other examples, distribution lines 16 can include multiple individual flow tubes extending to nozzles 18. In one example, spray system 10 can include the same number of flow tubes as nozzles 18, such that each nozzle 18 has a dedicated distribution line 16. Nozzles 18 are configured to eject the liquid as a liquid spray.

Nozzles 18 are mounted on distribution lines 16 to receive the liquid from distribution lines 16 and to expel the liquid as a spray. Nozzles 18 generate liquid sprays for application on the target ground surface, such as the field. Control module 22 can be configured to provide individual commands to each nozzle 18. For example, control module 22 can generate individual spray commands for each nozzle 18 and communicate each individual spray command to the nozzle controller 32 of each nozzle 18 to thereby control the spray parameters of the liquid spray emitted by each nozzle 18. In one example, the spray commands cause each nozzle 18 to emit a liquid spray having a specified droplet size at a specified application rate.

Valve 30 is disposed in nozzle 18 and controls the flow of liquid through nozzle 18. Valve 30 is actively controlled during operation. Valve 30 is capable of being actuated to a variety of open positions, with each of the open positions corresponding to a different flow path size through nozzle 18. The positioning of valve 30 controls the liquid flow rate in nozzle 18 and the liquid pressure in nozzle 18. In some examples, valve 30 is configured to control the dimensions of a flowpath through the body of nozzle 18. In other examples, valve 30 is configured to control the configuration of the orifice through which the liquid is ejected as a spray. Valve 30 can be actuated to any desired position to generate the liquid spray having the desired flow rate and droplet size. In one example, a first valve 30 controls the dimensions of a flowpath through the body of nozzle 18 and a second valve 30 controls the dimensions of a spray orifice of nozzle 18. In examples where nozzle 18 includes multiple valves 30, it is understood that the valves 30 can all be of the same configuration or can be of differing configurations. In examples where nozzle 18 includes multiple valves 30, the valves 30 can be individually controlled to generate a spray having the desired flow rate and droplet size.

Nozzle sensors 26 are disposed in nozzle 18 and are configured to generate nozzle data regarding the valves 30 in nozzle 18 and the spray liquid flowing through nozzle 18. In one example, a subset of nozzle sensors 26 can be associated with valves 30 and can generate valve position information regarding the positioning of components of valves 30. For example, valve 30 can be actuated by a stepper motor and the valve position information can be a step count. In other examples, nozzle sensor 26 can be a transducer, such as a linear transducer, configured to sense displacement of the valve member of valve 30 to generate the valve position information. Another subset of nozzle sensors 26 can be associated with the liquid flowpaths through nozzle 18 and can generate liquid parameter information regarding the liquid flowing through nozzle 18. For example, the liquid parameter information can include the flow rate, such as volumetric flow rate, of the liquid and/or the pressure of the liquid flowing through nozzle 18, among other options. As such, nozzle sensor 26 can include a flow sensor configured to sense a liquid flow rate, can include a pressure sensor configured to sense a liquid pressure, and/or can be of any other type suitable for generating the liquid parameter information. In some examples, nozzle 18 can include multiple nozzle sensors 26 of different types. For example, nozzle 18 can include first nozzle sensors 26 configured to generate valve position information and second nozzle sensors 26 configured to generate liquid parameter information. Nozzle sensors 26 are configured to provide the nozzle data to control module 22 and/or nozzle controller 32.

Spray sensors 28 are mounted proximate the outlet of each nozzle 18. Spray sensors 28 are configured to sense liquid spray emitted from the nozzle 18 and generate spray data regarding the liquid spray. In some examples, spray sensors 28 can sense the characteristics of the liquid spray, such as the width of the spray fan and the droplet size. Spray sensors 28 can generate and provide spray data to one or both of nozzle controller 32 and control module 22. As discussed in more detail below, each spray sensor 28 can include its own respective controller. Spray sensors 28 can be powered in any desired manner. For example, spray sensors 28 can be connected to vehicle power, such as the power of the agricultural spraying implement, or have a dedicated power source, such as a battery.

Spray sensors 28 can include optical sensors configured to sense the spray characteristics of the liquid spray. In some examples, spray sensors 28 can include optical emitters, such as light emitting didoes (LED) or lasers, and optical receivers. In some examples, each spray sensor 28 includes an array of optical sensors (such as one, two, three, four, five, or more optical sensors) spaced laterally and oriented towards the orifice of nozzle 18 such that the optical sensors face the liquid spray emitted by nozzle 18. In some examples, the multiple optical sensors are disposed orthogonal to the liquid spray, such as a spray fan, emitted by nozzle 18.

In one example, the optical sensors can include laser rangefinders. In a particular examples, the optical sensors can be time-of-flight laser rangefinders. The optical emitters can emit laser pulses and determine the spray characteristics based on returns of the laser pulses. The distance from the laser rangefinder to the spray fan can be measured prior to operation and stored for later use, such as by storing the measured distance in memory 36, in a memory of nozzle controller 32, and/or in a memory of spray sensor 28. In some examples, the laser rangefinders can be configured to have a maximum range that is sufficiently small to avoid false positives. For example, the laser rangefinder can be configured to have a maximum range of up to about 30 centimeters (about 11.8 inches). The spray sensor 28 is positioned relative to the expected location of the spray such that the spray is within the range of the rangefinder.

The optical sensors of spray sensors 28 emit directional light towards the expected position of the liquid spray and receive returns of the direction light due to reflection (or scattering) of the emitted direction light from the spray fluid emitted by the nozzle 18. For example, the array of optical emitters can determine the presence or absence of the spray fan based on the intensity of the light reflected back to spray sensor 28. If the optical sensor does not receive a return, then spray sensor 28 determines the absence of a liquid spray. If the optical sensors does receive a return, then spray sensor 28 determines the presence of a liquid spray.

In some examples, spray data from spray sensors 28 can be utilized to determine the size of the droplets emitted by nozzle 18 and/or confirm the size of the droplets emitted by nozzle 18. It is understood that liquid spray L can include a spray consisting of a skewed distribution of multiple droplet sizes that are characterized by a representative diameter (e.g., a volume median diameter (DV0.5)) or in relation to droplet size categories (e.g., as defined by American Society of Agricultural and Biological Engineers (ASABE) S-572.1). As such, the sensed droplet size can be understood as based on a representative diameter and/or based on a standardized category.

The flow rate of the liquid spray emitted from nozzle 18 can be determined by nozzle sensors 26. With the flow rate known, the size of the droplets can be determined based on the density of the droplets forming the liquid spray. As the size of the droplets increases, the density of the droplets decreases. As the size of the droplets decreases, the density of the droplets increase. The denser the distribution of the droplets forming the liquid spray, the greater the intensity of the directional light reflected by spray fan and returned to spray sensor 28. With the flow rate known, the size and/or size category of the droplets emitted by nozzle 18 can be determined based on the directional light reflected back to spray sensor 28. The various droplet size categories can be stored in memory 36 and control module 22 can provide droplet size information to the user based on the droplet size determined from the spray data from spray sensors 28 and the flow rate information from nozzle sensors 26. In some examples, the various droplet sizes sensed throughout operation can be stored in memory 36 to provide discrete tracking of the droplet distribution throughout spraying. In some examples, the concentration of droplets at each nozzle 18 and/or the concentration of droplets across the width of boom 14 can be determined based on the data generated by spray sensors 28.

Each nozzle 18 includes a nozzle controller 32 integrated into the nozzle 18. Nozzle controller 32 is configured to actuate valves 30 in response to spray commands from control module 22 and based on the state of spray system 10. Nozzle controller 32 is configured to cause valve 30 to actuate to a position configured to generate a spray having the desired application rate and droplet size. In some examples, nozzle controller 32 can determine the relative ground speed of its nozzle 18 based on the location of its nozzle 18 along distribution line 16 and the ground speed at each end of distribution line 16. For example, system sensors 20 can include ground speed sensors, such as speed sensors incorporating geo-positioning receivers. In one example, the ground speed sensors can be disposed at opposite ends of distribution lines 16. It is understood, however, that system sensors 20 can include any type of sensor suitable for generating the ground speed data. Nozzle controller 32 can be configured to determine the relative ground speed of nozzle 18 according to any suitable technique.

Nozzle controller 32 can be of any type suitable for controlling actuation of valve 30 based on commands from control module 22 and/or on nozzle data from nozzle sensors 26. Nozzle controller 32 can include control circuitry and memory. For example, nozzle controller 32 can include a microprocessor, a controller, a digital signal processor (DSP), an application specific integrated circuit (ASIC), a field-programmable gate array (FPGA), or other equivalent discrete or integrated logic circuitry.

While nozzle 18 is described as including nozzle sensor 26, valve 30, and nozzle controller 32, it is understood that spray sensor 28 can be associated with any nozzle of any type. For example, spray sensor 28 can be associated with a nozzle 18 that does not include one or more of nozzle sensor 26, valve 30, and nozzle controller 32. For example, nozzle 18 can be open to spray fluid whenever fluid is provided to nozzle 18. Spray sensor 28 can be positioned to detect that fluid spray.

Control module 22 is configured to generate and provide spray commands to nozzles 18 to cause nozzles 18 to emit liquid sprays according to a desired application rate and droplet size. In some examples, control module 22 generates individual spray commands and provides individual spray commands to each nozzle 18. In some examples, control module 22 provides individual spray commands to groups of nozzles 18. The application rate is a product of both the flow rate of the liquid in nozzle 18 and the speed of nozzle 18 relative to the surface being sprayed (i.e., the relative ground speed of nozzle 18). For example, the spray command can instruct nozzle 18 to emit a liquid spray having a first application rate and a first droplet size.

The spray command can be based on any desired input parameter. For example, a prescription map for a field can be stored in memory 36 of control module 22, and control module 22 can generate the spray commands based on the prescription map. Control module 22 can be configured to generate the spray commands based on geo-positioning data. For example, system sensors 20 can include a geo-positioning receiver communicatively linked to control module 22. Control module 22 can be configured to generate commands based on based on location data from GPS (Global Positioning System), GNSS (Global Navigation Satellite System), GPS/RTK (GPS/Real Time Kinematic), or equivalent systems.

Control module 22 can be of any suitable configuration for controlling operation of components of spray system 10, gathering data, processing data, etc. For example, control module 22 can generate spray commands, send the spray commands to nozzles 18, and receive data from nozzles 18. As such, control module 22 can be of any type suitable for operating in accordance with the techniques described herein. In some examples, control module 22 can be implemented as a plurality of discrete circuitry subassemblies. In some examples, control module 22 can be integrated with the control system for the agricultural implement. In other examples, control module 22 can be separate from and in communication with the control system of the agricultural implement.

Control circuitry 34 is configured to implement functionality and/or process instructions. Control circuitry 34 can include one or more processors configured to implement functionality and/or process instructions. For example, control circuitry 34 can be capable of processing instructions stored in memory 36. Examples of control circuitry 34 can include any one or more of a microprocessor, a controller, a digital signal processor (DSP), an application specific integrated circuit (ASIC), a field-programmable gate array (FPGA), or other equivalent discrete or integrated logic circuitry.

In some examples, control circuitry 34 can include communications circuitry configured to facilitate wired or wireless communications. In one example, the communications circuitry can be configured for wired interfaces. For example, the communications circuitry can include any one or more of a controller area network (CAN), universal asynchronous receiver/transmitter (UART), serial peripheral interface (SPI), among other interfaces. In wireless communications examples, the communications circuitry can facilitate radio frequency (RF) communications and/or can facilitate communications over a network, such as a local area network, wide area network, and/or the Internet. In one example, the communications circuitry can be configured for communication utilizing short-wavelength ultra high frequency (UHF) radio waves in the 2.4 GHz band (2.400-2.485 GHz) (e.g., Bluetooth® communications). In another example, the communications circuitry can be configured for communications utilizing super high frequency (SHF) radio waves in the 5 GHz band.

Memory 36, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 36 is a temporary memory, meaning that a primary purpose of memory 36 is not long-term storage. Memory 36, in some examples, is described as volatile memory, meaning that memory 36 does not maintain stored contents when power to spray system 10 is turned off. Examples of volatile memories can include random access memories (RAM), dynamic random access memories (DRAM), static random access memories (SRAM), and other forms of volatile memories. In some examples, memory 36 is used to store program instructions for execution by control circuitry 34. Memory 36, in one example, is used by software or applications running on control circuitry 34 to temporarily store information during program execution.

Memory 36, in some examples, also includes one or more computer-readable storage media. Memory 36 can be configured to store larger amounts of information than volatile memory. Memory 36 can further be configured for long-term storage of information. In some examples, memory 36 includes non-volatile storage elements. For example, spray system 10 can include non-volatile storage elements such as flash memories or forms of electrically programmable memories (EPROM) or electrically erasable and programmable (EEPROM) memories. In some examples, memory 36 can be external and can be received in a memory card slot of spray system 10. For example, memory 36 can be an external hard drive, flash drive, memory card, secure digital (SD) card, micro SD card, or other such device.

User interface 24 can be any graphical and/or mechanical interface that enables user interaction with control module 22. For example, user interface 24 can implement a graphical user interface displayed at a display device of user interface 24 for presenting information to and/or receiving input from a user. User interface 24 can include graphical navigation and control elements, such as graphical buttons or other graphical control elements presented at the display device. User interface 24, in some examples, includes physical navigation and control elements, such as physically-actuated buttons or other physical navigation and control elements. In general, user interface 24 can include any input and/or output devices and control elements that can enable user interaction with control module 22. In some examples, user interface 24 can be integrated into a cab of an agricultural spraying implement.

In some examples, user interface 24 can include one or more indicators, such as LED indicators, configured to indicate the presence or absence of a spray fan at each nozzle 18 based on the spray data generated by spray sensors 28. For example, the indicator can be illuminated when the presence of a liquid spray is detected, indicating the presence of a liquid spray at that nozzle 18. The LED indicator can then be dark when the presence of a liquid spray is not detected, indicating the absence of a liquid spray at that nozzle 18.

During operation, spray system 10 generates liquid sprays and applies the liquid sprays to a target surface. In one example, spray system 10 is an agricultural spray system that is traversed over a field and applies sprays of agricultural liquid to the field. Control module 22 generates spray commands and transmits the spray commands to nozzles 18. In some examples, control module 22 generates individual spray commands and transmits the individual spray commands to individual nozzles 18. The spray commands cause the nozzles 18 to emit liquid sprays according to a desired application rate and at a desired droplet size. For example, control module 22 can generate the spray commands based on a prescription map for the field that spray system 10 is traversing. The prescription map can be stored in memory 36.

For each nozzle 18, nozzle controller 32 actuates valve 30 based on the spray command to achieve the desired application rate and droplet size. Nozzle sensors 26 generate nozzle data, including valve position information and liquid parameter information, based on the position of valve 30 and the flow through nozzle 18. The nozzle data is provided to nozzle controller 32 and/or control module 22.

Spray sensor 28 emits directional light and generates spray data based on the reflection of the directional light back to spray sensor 28. If spray sensor 28 receives a return of the directional light, such as a laser pulse emitted by a laser rangefinder forming the optical emitter, then spray sensor 28 determines that a spray fan is present in front of that optical emitter. If spray sensor 28 does not receive a return of the directional light, then spray sensor 28 determines that a spray fan is absent from in front of that optical emitter. Spray sensor 28 can generate a spray signal based on spray sensor 28 detecting the presence or absence of the liquid spray.

Spray sensor 28 can generated a spray present signal based on spray sensor 28 sensing the presence of the spray fan. Spray sensor 28 can also be configured to generate a spray absent signal based on spray sensor 28 not sensing the presence of the spray fan. In some examples, spray sensor 28 can be configured to generate the spray signal only when spray sensor 28 senses the presence of a spray fan. As such, the absence of a spray fan can be determined based on spray sensor 28 not generating the spray signal.

Spray sensor 28 can transmit the spray signal directly to the user, such as via user interface 24, indicating to the user the status of the nozzle 18 as emitting or not emitting a liquid spray. Additionally and/or alternatively, spray sensor 28 can transmit the spray signal to a controller, such as nozzle controller 32 or control module 22, which controller can then transmit an indication to the user. For example, spray sensor 28 can transmit the spray signal to the controller via radio frequency communications. The controller can provide the status of each nozzle 18 to the user via user interface 24 and/or can store the various statuses and information regarding each status for later use. The various spray signals and spray data generated during operation can be stored in memory 36. For example, any one or more of the duration that the liquid spray was present, the start and stop times for each liquid spray emitted by each nozzle 18, and the locations in the field where the liquid spray was emitted, among other options, can be stored in memory 36 to provide discrete tracking.

Spray data from spray sensor 28 can be utilized to determine the status of a nozzle 18. Spray sensor 28 not sensing the presence of a spray fan when nozzle 18 is supposed to be emitting a spray fan can indicate a blockage in nozzle 18 or some other malfunction. Spray sensor 28 sensing the presence of a spray fan when nozzle 18 is not supposed to be emitting a spray fan can indicate a malfunction or failure of a component in nozzle 18. The spray data from spray sensor 28 can instantaneously alert the user to such a malfunction or failure.

In some examples, the spray data from spray sensor 28 can be utilized to determine the quality of the spray fan generated by nozzle 18. In one example, if some, but not all, of the optical sensors of spray sensor 28 sense the presence of the spray fan, such spray data can indicate a partial blockage of the nozzle 18 outlet and/or undesired wear of components of the nozzle 18. As discussed above, the spray data from spray sensor 28 can also be utilized to determine the droplet size and/or droplet size category of the droplets forming the liquid spray.

Spray sensors 28 provide significant advantages. Spray sensors 28 sense the presence or absence of a liquid spray at nozzle 18. Spray sensors 28 can provide such spray information to the user, which indicates which nozzles 18 are or are not currently generating a spray. Spray sensor 28 not sensing the presence of a spray fan when nozzle 18 is supposed to be emitting a spray fan can indicate a blockage in nozzle 18 or some other malfunction. Spray sensor 28 sensing the presence of a spray fan when nozzle 18 is not supposed to be emitting a spray fan can indicate a malfunction or failure of a component in nozzle 18. The data from spray sensor 28 can instantaneously alert the user to such malfunction or failure. As such, the user is able to address the malfunction or failure in real time, preventing over-application and under-application of the spray liquid. In addition, the spray data can be aggregated throughout one or more spray jobs. Aggregating spray data provides accurate tracking to the user to show those portions of the field where nozzle 18 was actually emitting a spray fan. Such data allows the user to better track applications and plan future applications.

Figure 2A:
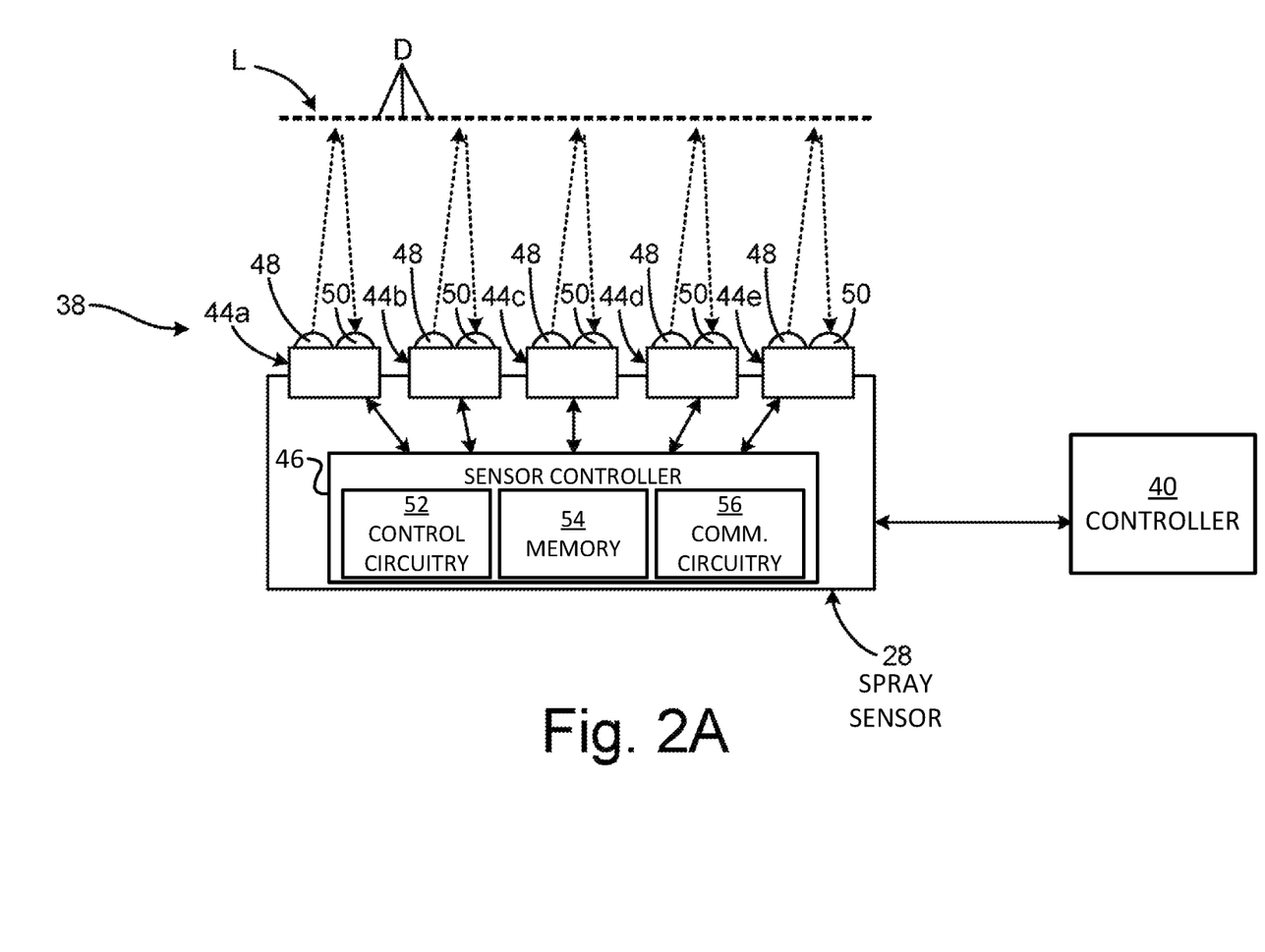
FIG. 2A is a top schematic block diagram of a spray monitoring system.
Figure 2B:
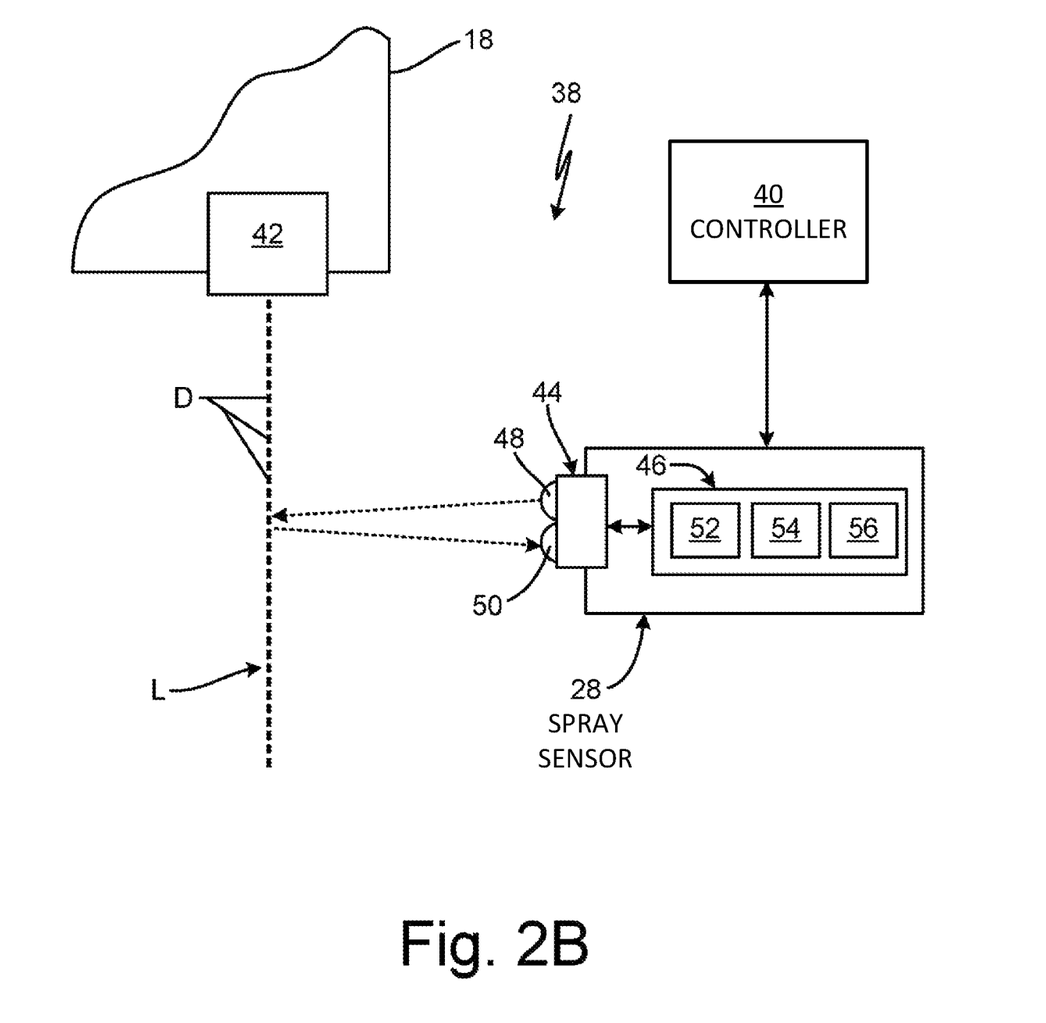
FIG. 2B is a side schematic block diagram of a spray monitoring system.

FIG. 2A is a top schematic block diagram of spray monitoring system 38. FIG. 2B is a side schematic block diagram of spray monitoring system 38. FIGS. 2A and 2B will be discussed together. Spray monitoring system 38 includes spray sensor 28, nozzle 18 (FIG. 2B), and controller 40 of spray system 10 (FIG. 1). Spray outlet 42 (FIG. 2B) of nozzle 18 is shown. Spray sensor 28 includes optical sensors 44a-44e (referred to collectively as optical sensor 44) and sensor controller 46. A single optical sensor 44 is shown in FIG. 2B. Each optical sensor 44 includes optical emitter 48 and optical receiver 50. Sensor controller 46 includes control circuitry 52, memory 54, and communications circuitry 56.

Spray monitoring system 38 is configured to sense spray characteristics of a liquid spray L emitted by nozzle 18, such as the presence of the liquid spray L and/or the size of droplets forming the liquid spray L. The liquid spray L is formed from droplets D. Spray monitoring system 38 is further configured to provide data regarding the spray characteristics to the user and/or to store the data for later use.

Nozzle 18 is configured to emit a liquid spray L through spray outlet 42. Spray sensor 28 is mounted proximate spray outlet 42 of nozzle 18. Spray sensor 28 is spaced from the expected position of liquid spray L when nozzle 18 is emitting liquid spray L. It is understood that spray outlet 42 can be configured to emit a liquid spray having any desired pattern, such as a flat fan, hollow cone, full cone, or any other desired spray pattern.

Controller 40 is a system controller that is configured to provide commands to and receive information from spray sensor 28. For example, controller 40 can be one of nozzle controller 32 (FIG. 1) or control module 22 (FIG. 1).

Optical sensors 44 are disposed in an array relative to liquid spray L. For each optical sensor 44, optical emitter 48 is configured to emit directional light towards liquid spray L. Optical receiver 50 is configured to receive the directional light reflected from the droplets forming liquid spray L. For example, optical emitter 48 can emit a laser pulse towards liquid spray L and optical receiver 50 can be configured to receive the reflected laser pulse. The presence or absence of liquid spray L can be determined according to any suitable technique. In one example, optical sensors 44 include laser rangefinders, such as time-of-flight laser rangefinders. The presence or absence of liquid spray L can be determined by the intensity of the reflected laser pulse or merely the presence of reflected light. Rangefinders are beneficial because there is a tight coupling between the emitter and receiver in the time domain that virtually eliminates the possibility of interference from neighboring emitters, which will have outputs that are uncorrelated in time. Further, rangefinders allow simple rejection of signal reflected from object which are not within the range of distance in which the spray is expected. Range or time-of flight information is not critical to the sensor concept and a simple emitter/receiver components can be used. While optical sensors 44 are described as including laser emitters 48 and receivers 50, it is understood that optical sensors 44 can be of any type suitable for detecting the presence of liquid spray L. For example, optical sensors 44 can include LED/photodiode emitters/receivers. In addition, while spray sensor 28 is shown as including five optical sensors 44, it is understood that spray sensor 28 can include as many or as few optical sensors 44 as desired (e.g, one, two, three, four, six, seven, or any other desired number of optical sensors 44). Additionally, a single receiver may be pared with more than one emitter, where the emitter pulse frequency or timing are used to determine which emitter the signal is from. In this way the number of receivers needed can be reduced. The converse arrangement can also be envisioned, where the receivers are disposed to view a small area of the spray which is illuminated more broadly with a single emitter. Temporal modulation of the emitted light or the chosen wavelength can help distinguish the illumination from background sources, such as the sun and other ambient light.

Optical sensors 44 are operatively connected to sensor controller 46 of spray sensor 28. Sensor controller 46 is configured to activate and deactivate optical sensors 44 and to gather spray data generated by optical sensors 44. Sensor controller 46 is, in some examples, further configured to communicate the spray data to the user, either directly or via controller 40.

In some examples, spray data generated by spray sensor 28 can be utilized to determine the droplet size of the droplets forming liquid spray L. It is understood that liquid spray L can include a spray consisting of a skewed distribution of multiple droplet sizes that are characterized by a representative diameter or in relation to droplet size categories. As such, the sensed droplet size can be understood as based on a representative diameter and/or based on a standardized category. The droplet size and/or droplet size category can be determined based on the intensity of the directional light received by optical receivers 50 and on the flow rate of the liquid through spray outlet 42. For example, spray sensor 28 can provide spray data to controller 40, and controller 40 can determine the droplet size based on the spray data and on the flow rate of the liquid being emitted as the liquid spray L.

Control circuitry 52 can include one or more processors. Memory 54 can be encoded with instructions that, when executed by the one or more processors, cause control circuitry 52 and/or other elements of spray sensor 28 to operate in accordance with techniques described herein. Examples of such processors can include any one or more of a microprocessor, a controller, a digital signal processor (DSP), an application specific integrated circuit (ASIC), a field-programmable gate array (FPGA), or other equivalent discrete or integrated logic circuitry.

Memory 54 can be configured to store information within sensor controller 46 during operation. Memory 54, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 54 can include temporary memory, meaning that a primary purpose of the computer-readable memory is not long-term storage. Computer-readable memory 54, in some examples, can be described as a volatile memory, meaning that the computer-readable memory 54 does not maintain stored contents when electrical power to spray sensor 28 is removed. Examples of volatile memories can include random access memories (RAM), dynamic random access memories (DRAM), static random access memories (SRAM), and other forms of volatile memories. In some examples, computer-readable memory 54 can be used to store program instructions for execution by one or more processors of control circuitry 52. For instance, computer-readable memory 54 of control circuitry 52 can be used by software or applications executed by control circuitry 52 to temporarily store information during program execution.

Spray sensor 28 is communicatively connected to controller 40 by communications circuitry 56. Spray sensor 28 can be wirelessly connected to controller 40 to provide spray data generated by optical sensors 44 to controller 40. Communications circuitry 56 can be configured to facilitate wireless communications with other components of the spray system 10, such as controller 40. For example, the communications circuitry can facilitate radio frequency (RF) communications. In one example, the communications circuitry 56 can be configured for communication utilizing short-wavelength ultra high frequency (UHF) radio waves in the 2.4 GHz band (2.400-2.485 GHz) (e.g., Bluetooth® communications). In another example, the communications circuitry 56 can be configured for communications utilizing super high frequency (SHF) radio waves in the 5 GHz band. It is understood, however, that communications circuitry 56 can also be configured for wired communications. For example, communications circuitry 56 can be configured to communicate via a controller area network (CAN), universal asynchronous receiver/transmitter (UART), serial peripheral interface (SPI), among other interfaces.

During operation, nozzle 18 emits liquid spray L for application on a surface, such as within a field. Spray sensor 28 is configured to determine whether liquid spray L is present and, in some examples, can determine various spray characteristics of the liquid spray L.

Controller 40 can provide a spray alert to spray sensor 28 based on a spray command being sent to nozzle 18 associated with spray sensor 28. That spray alert indicates to spray sensor 28 that nozzle 18 should be emitting a liquid spray L in accordance with the spray command. Spray sensor 28 can activate optical sensors 44 based on spray sensor 28 receiving the alert from controller 40. In some examples, spray sensor 28 can be configured to intermittently activate optical sensors 44 regardless of any spray alert. For example, spray sensor 28 can be configured to activate optical sensors 44 based on the passage of a time interval, such as every five seconds, for example. While spray sensor 28 is described as activating optical sensors 44 at an interval of every five seconds, it is understood that spray sensor 28 can be configured to activate optical sensors 44 according to any desired interval, such as every two seconds, ten seconds, fifteen seconds, or any other desired interval. Spray sensor 28 can maintain spray sensors 28 in the active state if optical sensors 44 sense the presence of liquid spray L. In other examples, spray sensor 28 can continue to cycle optical sensors 44 on and off after sensing the presence of liquid spray L. In some examples, spray sensor 28 can be configured to activate optical sensors 44 whenever spray system 10 is active, such that optical sensors 44 continuously emit the directional light throughout operation.

With optical sensors 44 activated, optical emitters 48 emit directional light towards the expected position of liquid spray L. When the liquid spray L is emitted from spray outlet 42, the directional light reflects off of the droplets forming the liquid spray L and the reflected directional light is received by optical receivers 50. For each optical sensor 44, if optical receiver 50 does not receive reflected directional light, then spray sensor 28 determines that no liquid spray L is being emitted in the path of the directional light from optical emitter 48. If optical receiver 50 does receive reflected directional light, then spray sensor 28 determines that liquid spray L is being emitted in the path of the directional light from optical emitter 48. Spray sensor 28 can inform the user when optical sensors 44 do or do not detect the presence of liquid spray L, such as via user interface 24 (FIG. 1).

Spray sensor 28 can further determine the status of nozzle 18, such as whether nozzle 18 is operating normally, based on the data received from each of optical sensors 44. For example, spray sensor 28 can determine that there is a malfunction, such as a blockage in nozzle 18 and/or that components of nozzle 18 have worn and require replacement, based on the data from optical sensors 44. In some examples, when nozzle 18 emits a liquid spray L, spray sensor 28 expects to sense the liquid spray across the full width of the liquid spray L. If some, but not all, of spray sensors 28 sense the presence of the liquid spray L, then a malfunction may have occurred. For example, if optical sensors 44a, 44b, and 44e sense the presence of the liquid spray L, but optical sensors 44c and 44d do not, then there is a gap in the liquid spray L. Gaps are generally caused by a blockage in spray outlet 42. Spray sensor 28 can alert the user that a malfunction has occurred at nozzle 18 based on the discrepancies between the data from optical sensors 44a, 44b, and 44e and optical sensors 44c and 44d.

In some examples, at least one of spray sensor 28 and controller 40 is configured to determine the liquid spray status based on a sensed concentration of the liquid, such as droplets D, forming the liquid spray L. For example, a heavier spray at one location on liquid spray L with regard to other locations on liquid spray L can be undesirable. Spray sensor 28 can sense such a variation, which can indicate a nozzle malfunction or some other issue, and can provide an alert based on that variation. In some examples, a variation threshold can be stored in memory 54 and/or a memory of controller 40 and the variations can be compared to the variation threshold to determine if the variation is within acceptable limits. The variation threshold can be based on any desired parameters, such as percent difference in reflected intensity, the locations of the variations across the liquid spray L, the magnitude of the variations, among other options. For example, a gradual change in the concentration or a heavier concentration at the edges of a liquid spray L fan can be acceptable, whereas abrupt changes and heavier concentrations in the center of the liquid spray L fan can indicate an issue.

In some examples, spray sensor 28 can provide an alert to the user when nozzle 18 is emitting a liquid spray but is not meant to be emitting any liquid spray L. Such detection of the liquid spray L when no liquid spray L is expected can indicate excessive wear of components of nozzle 18 and/or a failure of the closing mechanism for spray outlet 42. Additionally and/or alternatively, spray sensor 28 can be configured to alert the user when optical sensors 44 do not detect the presence of liquid spray L when nozzle 18 is meant to be emitting liquid spray L. Such failure to detect the expected liquid spray L can indicate that nozzle 18 is not receiving the spray command and/or the failure of a component of nozzle 18.

Spray sensor 28 can store the spray data generated by optical sensors 44 in memory 54. The data can be stored for tracking purposes and for later offloading and use. For example, spray sensor 28 can log any one or more of the duration that the spray fan was present, the start and stop times for each spray fan, which ones of spray sensors 28 detected liquid spray L, and the locations in the field where the spray fan was generated, among other options.

Spray sensor 28 can additionally and/or alternatively communicate the spray data to controller 40. For example, spray sensor 28 can transmit the spray data to controller 40 via communications circuitry 56, via either a wired or wireless interface. In one example, spray sensor 28 can wirelessly transmit the spray data to controller 40 via 2.4 GHz (e.g., Bluetooth® communications) and/or 5 GHz bands. In other examples, spray sensor 28 can transmit the spray data via a controller area network (CAN), universal asynchronous receiver/transmitter (UART), serial peripheral interface (SPI), among other interfaces. Controller 40 can store the data from one or more spray sensors 28 and provide alerts to the user based on the data received from the one or more spray sensors 28. In some examples, controller 40 can compare data from multiple ones of spray sensors 28 to compare spraying from various nozzles 18. Controller 40 can compare the outputs from each nozzle 18 to determine an expected spray pattern based on the commanded spray. In addition, the comparison can indicate when a nozzle 18 is functioning differently from other nozzle 18 even when the sensed characteristics of the spray fall within acceptable boundaries.

Spray monitoring system 38 provides significant advantages. Spray monitoring system 38 can sense the presence or absence of liquid spray L in real-time and can provide alerts regarding the liquid spray to the user. The real-time information allows the user and/or controller 40 to rapidly adjust spraying based on the status of each nozzle 18. In addition, detecting blockages and/or other unexpected variations in the expected spray helps prevent over-application and/or under-application of liquids in agricultural spraying. Communications circuitry 56 facilitates wireless communications between spray sensor 28 and other components of spray system 10.

Figure 3:
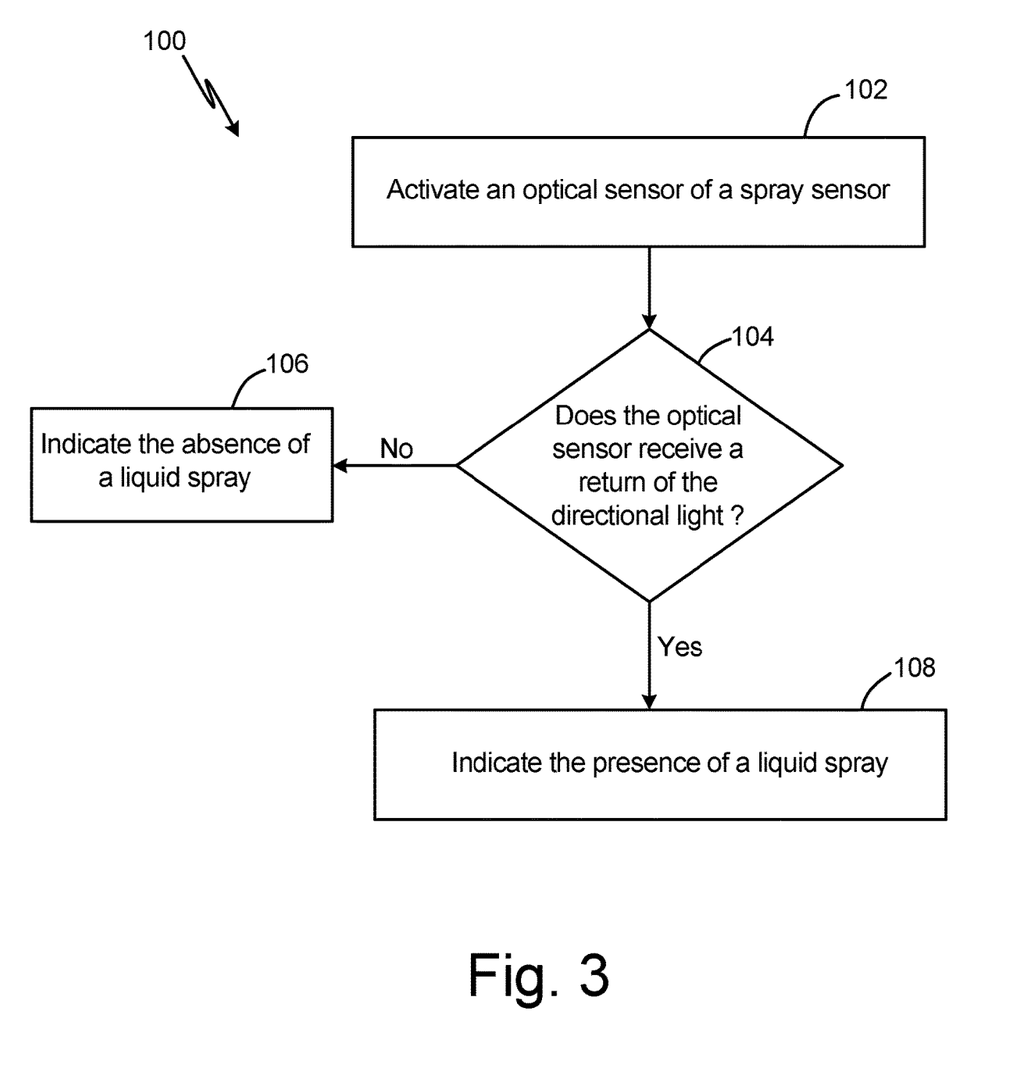
FIG. 3 is a flowchart illustrating a method.

FIG. 3 is a flowchart illustrating method 100. In step 102, a spray sensor, such as spray sensor 28 (FIGS. 1-2B), activates optical sensors, such as optical sensors 44 (FIGS. 2A and 2B) of the spray sensor. The optical sensors emit directional light, such as laser pulses, based on the activation from spray sensor.

In step 104, the spray sensor determines if a liquid spray is being emitted by a spray nozzle, such as nozzle 18 (FIGS. 1 and 2B), associated with the spray sensor. The determination is based on whether the optical sensor receives a reflection of the directional light. If the answer in step 104 is no, then method 100 proceeds to step 106. If the answer in step 104 is yes, then method 100 proceeds to step 108.

In step 106, the spray sensor determines that a liquid spray is not being emitted by the spray nozzle based on the optical sensor not receiving a return of the directional light. The spray sensor can indicate the absence of any liquid spray to the user, either directly or via another device, such as control module 28 (FIG. 1) or controller 40 (FIG. 2). In step 108, the spray sensor determines that the liquid spray is being emitted by the spray nozzle based on the optical sensor receiving a return of the directional light. The spray sensor can indicate the presence of the liquid spray to the user, either directly or via another device, such as control module 28 or controller 40.

Figure 4:
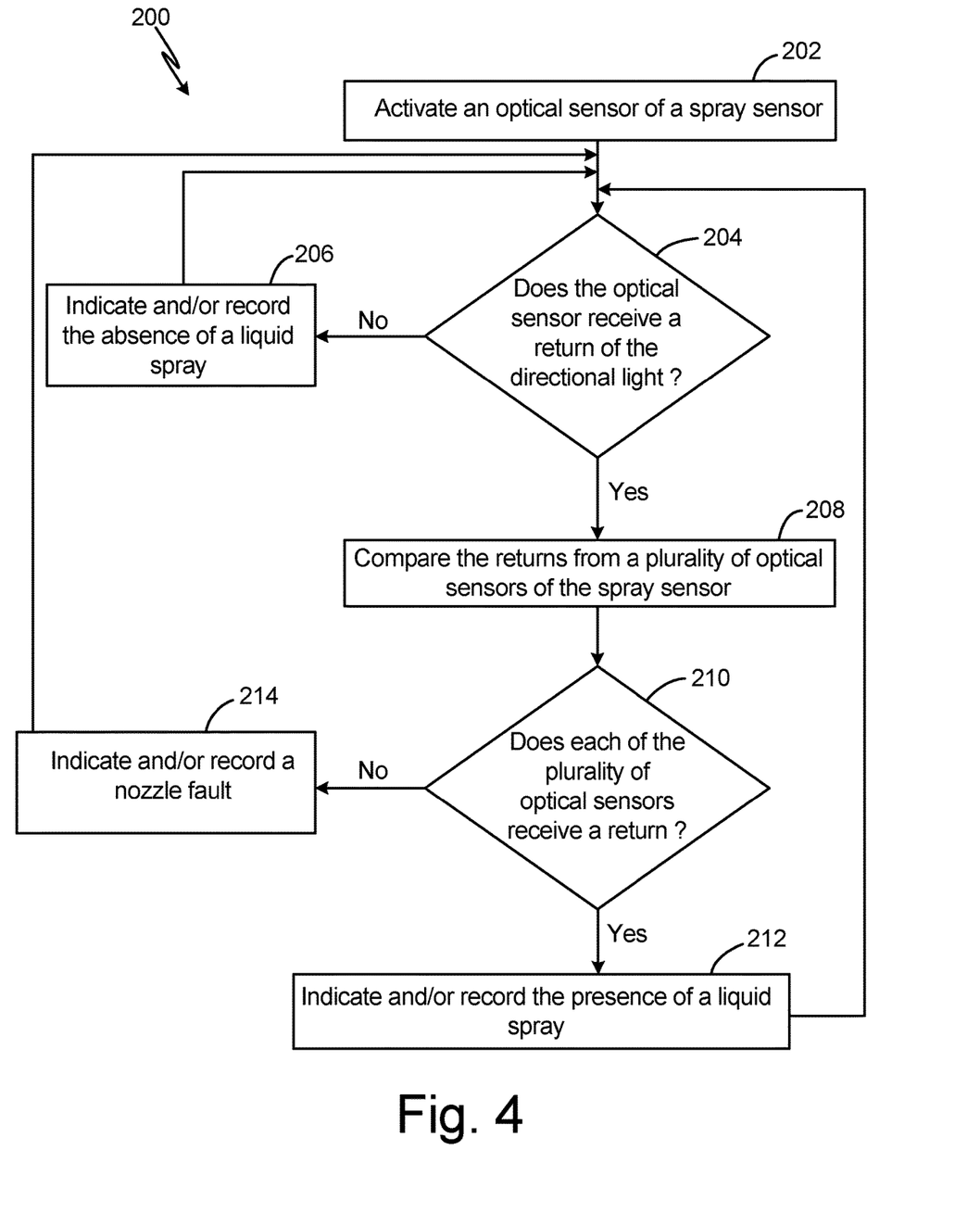
FIG. 4 is a flowchart illustrating a method.

FIG. 4 is a flowchart illustrating method 200. In step 202, a spray sensor, such as spray sensor 28 (FIGS. 1-2B), activates optical sensors, such as optical sensors 44 (FIGS. 2A and 2B) of the spray sensor. The optical sensors emit directional light, such as laser pulses, based on the activation from spray sensor.

In step 204, the spray sensor determines if a liquid spray is being emitted by a spray nozzle, such as nozzle 18 (FIGS. 1 and 2B), associated with the spray sensor. The determination is based on whether the optical sensor receives a reflection of the directional light. If the answer in step 204 is no, then method 200 proceeds to step 206. If the answer in step 204 is yes, then method 200 proceeds to step 208.

In step 206, the spray sensor determines that a liquid spray is not being emitted by the spray nozzle based on the optical sensor not receiving a return of the directional light. The spray sensor can indicate the absence of any liquid spray to the user, either directly or via another device, such as control module 22 (FIG. 1) or controller 40 (FIG. 2). The absence of the liquid spray can also be recorded in a memory, such as memory 54 (FIGS. 2A-2B) and/or memory 36 (FIG. 1), for later use. Data regarding the absence of the liquid spray, such as the time of the reading, the location in the field that the reading occurred, etc. can also be recorded.

In step 208, a controller, such as the controller of the spray sensor or the system controller, compares the directional light return from a plurality of optical sensors. In step 210, the controller determines if each of the optical sensors of the plurality of optical sensors received a return. The comparison can indicate if the nozzle is malfunctioning, either due to a blockage or a component failure. For example, the controller can compare the returns to determine if each of the plurality of optical sensors received a return of the directional light. If each optical sensor receives an expected return, then controller determines that the nozzle is emitting the liquid spray as expected. In step 212, the controller indicates the presence of the liquid spray to the user, such as via a user interface device, and/or records the presence of the liquid spray. For example, the controller can record data regarding the presence of the liquid spray, such as the time of the reading, the location in the field that the reading occurred, etc.

If one or more of the plurality of optical sensors does not receive an expected directional light return, then controller determines that nozzle is emitting the liquid spray in an undesired manner. For example, where some, but not all, of the optical sensors receive the return, that can indicate an inconsistency in the spray pattern generated by the nozzle. For example, a blockage, such as sediment, may be blocking some of the nozzle outlet, causing the undesired spray pattern. In step 214, the controller indicates a nozzle fault to the user, such as via a user interface device, and/or records the data regarding the nozzle fault. For example, the controller can record data regarding the time of the nozzle fault, the location in the field that the nozzle fault occurred, which optical sensors do/not receive the return, etc.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray sensor for monitoring a liquid spray emitted by a spray nozzle, the spray sensor comprising:
   a plurality of optical sensors configured to emit and receive directional light; and
   a sensor controller operably connected to the plurality of optical sensors, the sensor controller comprising:
   control circuitry; and
   a memory encoded with instructions that, when executed by the control circuitry, cause:
      a first optical sensor of the plurality of optical sensors to emit a first output of directional light substantially orthogonal to the liquid spray;
      a second optical sensor of the plurality of optical sensors to emit a second output of directional light substantially orthogonal to the liquid spray; and
      the sensor controller to determine, based on a comparison of a first return of the first output of directional light reflected by the liquid spray and received by the first optical sensor and a second return of the second output of directional light reflected by the liquid spray and received by the second optical sensor, a liquid spray status of the liquid spray emitted by the spray nozzle; wherein the liquid spray status comprises:
      an absent liquid spray status when at least one of the first optical sensor and the second optical sensor does not receive a respective return of the directional light; and
      a present liquid spray status when each of the first optical sensor and the second optical sensor receives the respective returns of the directional light.

2. The spray sensor of claim 1, wherein the first optical sensor comprises a laser range finder.

3. The spray sensor of claim 1, wherein the sensor controller further comprises:
   communications circuitry configured to wirelessly communicate with the control circuitry and with a control module of an agricultural implement.

4. The spray sensor of claim 3, wherein the communications circuitry is configured to communicate on at least one of a 2.4 GHz band and a 5 GHz band.

* * * * *